United States Patent [19]

Persyk et al.

[11] Patent Number: 4,574,478
[45] Date of Patent: Mar. 11, 1986

[54] METHOD AND DEVICE FOR DEMOUNTING IN A RADIATION DETECTOR A PHOTOMULTIPLIER TUBE

[75] Inventors: Dennis E. Persyk, Barrington; Everett W. Stoub, Villa Park, both of Ill.

[73] Assignee: Siemens Gammasonics, Inc., Des Plaines, Ill.

[21] Appl. No.: 497,484

[22] Filed: May 24, 1983

[51] Int. Cl.$^4$ ............................................. B26B 27/00
[52] U.S. Cl. ....................................... 30/116; 29/764; 156/344
[58] Field of Search ............... 43/87; 269/131; 81/64; 156/344; 294/31.2; 24/115 G, 115 K, 131 C; 29/764; 83/200.1, 651.1; 30/116; 128/320

[56] References Cited

U.S. PATENT DOCUMENTS

| | | | |
|---|---|---|---|
| 45,746 | 1/1865 | Perry | 81/651.1 |
| 949,900 | 2/1910 | Jackson | 269/131 |
| 1,461,864 | 7/1923 | Day | 128/320 |
| 1,906,582 | 5/1933 | Gundlach | 83/200.1 X |
| 2,582,339 | 1/1952 | Krueger | 43/87 |
| 2,996,419 | 8/1961 | Schmick . | |
| 3,051,179 | 8/1962 | Dwyer | 81/64 |
| 3,181,533 | 5/1965 | Health | 128/320 |
| 3,372,459 | 3/1968 | Lambright | 156/344 |
| 3,723,735 | 3/1973 | Spelha et al. | |
| 4,029,964 | 6/1977 | Ashe . | |
| 4,247,285 | 1/1981 | Roig-Green | 128/320 |
| 4,280,051 | 7/1981 | Engdahl et al. | |
| 4,323,778 | 4/1982 | Wykes et al. | |
| 4,399,602 | 8/1983 | Hancock et al. | 83/651.1 |

FOREIGN PATENT DOCUMENTS 2519034  11/1976  Fed. Rep. of Germany .

OTHER PUBLICATIONS

Brochure Harshaw Scintillation Phosphors D-4550 of the Harshaw Chemical Company, Crystal & Electronic Products Dept., Solon, Ohio, p. 43, left column, lines 3 and 4.
Section 2.1 of the brochure "Oken Synthetic Optical Crystals & Scintillation Phosphors" of Ohyo Koken Kogyo Co., Tokyo, Japan.
GE brochure CDS-1870A "RTV Silicone Rubber Product Data RTV 615, RTV 655 and RTV 670, High Strength Transparent Silicone Rubber Compounds.
Dow Corning's brochure "Materials for High Technology Applications", p. 22.

Primary Examiner—Kenneth J. Ramsey
Attorney, Agent, or Firm—Mark H. Jay

[57] ABSTRACT

A method and device are provided for demounting in a radiation detector a photomultiplier tube the bottom of which is solely bonded with a scintillation crystal assembly by means of an elastic light transparent adhesive. A shearing tool is placed at the bond between photomultiplier tube and scintillation crystal assembly which is operated such that it shears the bond. Especially as a shearing tool a thread is placed around the bond such that it forms a noose. The thread ends have been wrapped around a rod. When twisting the rod the thread continues to wind around the rod thereby making the loop smaller and shearing the bond.

9 Claims, 5 Drawing Figures

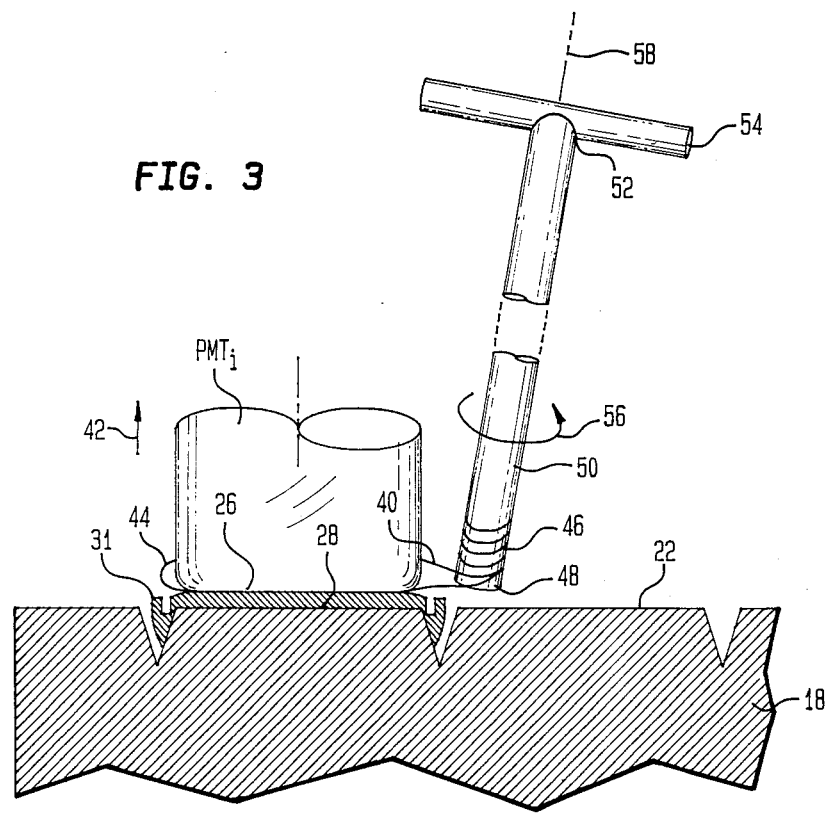
FIG. 3
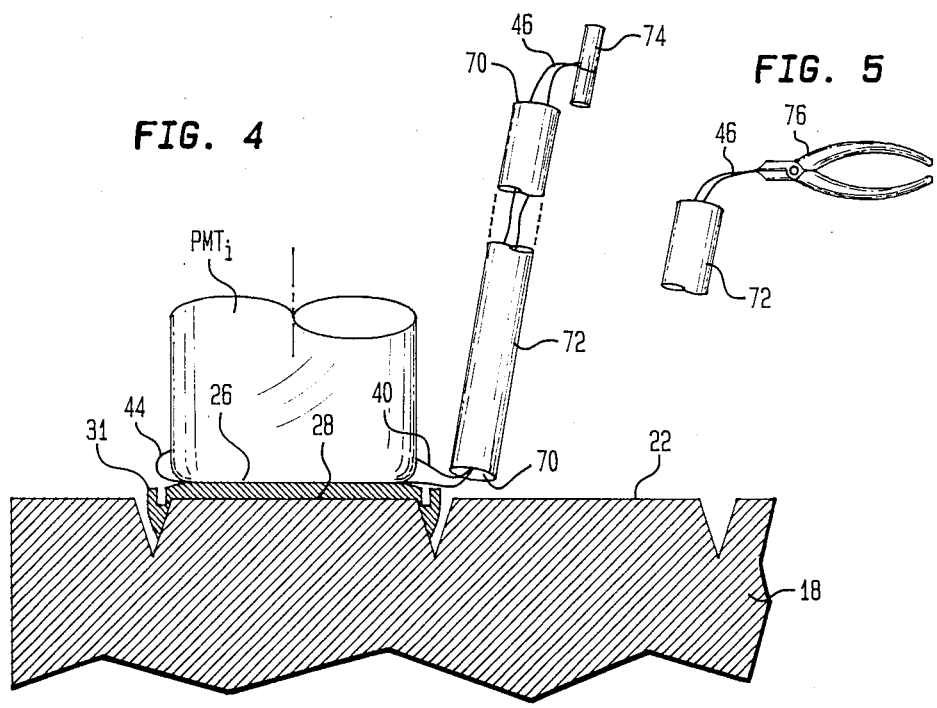
FIG. 4
FIG. 5

METHOD AND DEVICE FOR DEMOUNTING IN A RADIATION DETECTOR A PHOTOMULTIPLIER TUBE

CROSS-REFERENCE TO RELATED APPLICATIONS

This invention relates to the same technical field as the commonly-owned, co-pending applications Ser. No. 497,485 filed 5/24/83 by Dennis E. Persyk and Everett W. Stoub entitled "Radiation Detector with Bonded Optics", Ser. No. 497,487 filed 5/24/83 by Everett W. Stoub entitled "Method and Device for Demounting in a Radiation Detector a Photomultiplier Tube", Ser. No. 497,488 filed 5/24/83 by Gustav O. Engelmohr entitled "Method and Device for Demounting in a Radiation Detector a Photomultiplier Tube" and Ser. No. 497,486 filed 5/24/83 by Werner J. Haas and Everett W. Stoub entitled "Light Pipe for Scintillation Crystal Assembly of a Radiation Detector and Method for Producing the Same", filed on the same day as this application.

BACKGROUND OF THE INVENTION

1. Field of the Invention

This invention relates to a method and device for demounting in a radiation detector a photomultiplier tube which is bonded with a scintillation crystal assembly by means of an elastic light transparent adhesive. A preferred field of application of the invention is a scintillation gamma camera as radiation detector, which comprises a plurality of photomultiplier tubes connected with an scintillation crystal assembly.

2. Description of the Prior Art

Conventional radiation detectors which comprise merely one photomultiplier tube normally make use of epoxy resin as adhesive for coupling the sole photomultiplier tube to the scintillation crystal assembly. Epoxy resin, however provides a rigid bond (see for example the brochure Harshaw Scintillation Phosphors D-4450 of the Harshaw Chemical Company, Crystal & Electronic Products Department, Solon, Ohio, page 43, left column, lines 3 and 4). Due to this, in the case the sole photomultiplier tube becomes defective, a decoupling and replacement of the latter one is not possible. Thus usually the complete radiation detector comprising the defective photomultiplier tube and the scintillation crystal assembly has to be thrown away.

This procedure, however is not practicable for those radiation detectors which comprise a plurality of photomultiplier tubes, such as for example for a scintillation gamma camera. It would become too expensive to throw away a complete camera head merely for that reason that one sole photomultiplier tube had become defective. Due to this in conventional radiation detectors such as scintillation gamma cameras which comprise an assembly of photomultiplier tubes, use is made of an silicone compound with grease-like properties (e.g. silicone oil as for example described in section 2.1 of the brochure "Oken Synthetic Optical Crystals and Scintillation Phosphors" of Ohyo Koken Kogyo Co., Tokyo, Japan) as optical coupling medium for coupling the photomultiplier tubes with the scintillation crystal assembly. This conventional optical coupling compound, however remains semi-fluid and requires mechanical constraint and pressure loading to reduce the rate of spontaneous decoupling, as described for example in the U.S. Pat. Nos. 3,723,735 and 4,280,051, where the photomultiplier tubes have to be spring biased. Even with extensive care, spontaneous decoupling occurs occassionally after installation of a detector unit.

According to the U.S. Pat. No. 4,029,964 other light transparent adhesives, such as for example silicone rubber, have been practiced within an scintillation crystal assembly to couple a light conduction element such as a light pipe with a bilateral glass cover disc for the scintillation crystal. The light transparent silicone rubber is applied in liquid or gel form and is therafter cured. However, to secure the photomultiplier tubes in optical communication with the light conducting element of the scintillation crystal assembly again a conventional grease-like optical coupling compound is used to couple the photomultiplier tubes with the scintillation crystal assembly.

A radiation detector, which comprises two scintillation crystals which are bonded by means of a resilient silicone rubber compound to a photomultiplier tube is described in the U.S. Pat. No. 4,323,778. However, as shown in FIG. 3 of this U.S. patent both the scintillation crystals and the photomultiplier tube are completely embedded in the silicone rubber compound. A decoupling of the photomultiplier tube is only possible by destroying of the complete assembly of photomultiplier tube and scintillation crystal. As namely described on page 1, lines 29 to 30 of the German laid-open specification No. 2,519,034 or as mentioned in col. 1, lines 42 and 47, 48 of the U.S. Pat. No. 2,996,419 silicone rubber despite its casting elasticity has a very high adhesive strength. Thus a decoupling without destruction of photomultiplier tube and/or scintillation crystal assembly seemed to be unimaginable.

SUMMARY OF THE INVENTION

1. Objects

It is an object of this invention to provide a method and a device for easily demounting in a radiation detector a photomultiplier tube which is bonded with a scintillation crystal assembly by means of an elastic light transparent adhesive.

2. Summary

According to this invention a method and a device are provided for demounting in a radiation detector a photomultiplier tube the bottom of which is solely bonded with a scintillation crystal assembly by means of an elastic light transparent adhesive. The method comprises the steps of:

(a) placing a shearing tool at the bond between photomultiplier tube and scintillation crystal assembly; and (b) operating the shearing tool such that it shears the bond.

The demounting device comprises:

(a) a shearing tool placeable at the bond between photomultiplier tube and scintillation crystal assembly; and (b) means for operating the shearing tool such that it shears the bond.

In contrast to the radiation detector of the U.S. Pat. No. 4,323,778 in this radiation detector merely the bottom of the photomultiplier tube is bonded with the scintillation crystal assembly by means of an elastic light transparent adhesive. This, however, allows easy demounting of the photomultiplier tube according to this invention. Under these circumstances throwing away of a complete detector assembly is no longer necessary, when merely one photomultiplier tube becomes defective. On the contrary, in such a case solely the defective photomultiplier tube needs to be removed according to this invention. Thus grace to the invention a defective photomultiplier tube can very easily be replaced though this photomultiplier tube is bonded to the scintillation crystal assembly by means of an elastic adhesive (such as a silicone rubber compound for example), which has a relatively high adhesive strength. However, high adhesive strength of the bond combined with a relatively high degree of elasticity is desired. Spring biasing of photomultiplier tubes or other pressure loading is no longer necessary. This reduces mechanical complexity and cost and removes excess pressure loading onto the fragile scintillation crystal. The bonding produced by the light transparent adhesive is also elastic enough to conform to differential expansion rates with temperatures, which the materials of photomultiplier tube and scintillation crystal assembly provide.

In a preferred embodiment of this invention the shearing tool comprises a thread (e.g. simple music wire) and a rod. The thread is placed around the bond such that it forms a noose. The thread ends are wrapped around the rod. By twisting the rod the thread continues to wind around the rod thereby making the loop smaller and shearing the bond.

The foregoing and other objects, features and advantages of the invention will be apparent from the following more particular description of preferred embodiments of the invention, as illustrated in the accompanying drawings.

BRIEF DESCRIPTION OF THE DRAWINGS

In the drawings:

FIG. 3 shows a preferred first embodiment of a decoupling method and tool according to the invention;

FIG. 4 shows a modified second embodiment of a decoupling method and tool according to the invention; and FIG. 5 shows a modification of the embodiment of FIG. 4.

DETAILED DESCRIPTION OF THE PREFERRED EMBODIMENTS

Figure 1:
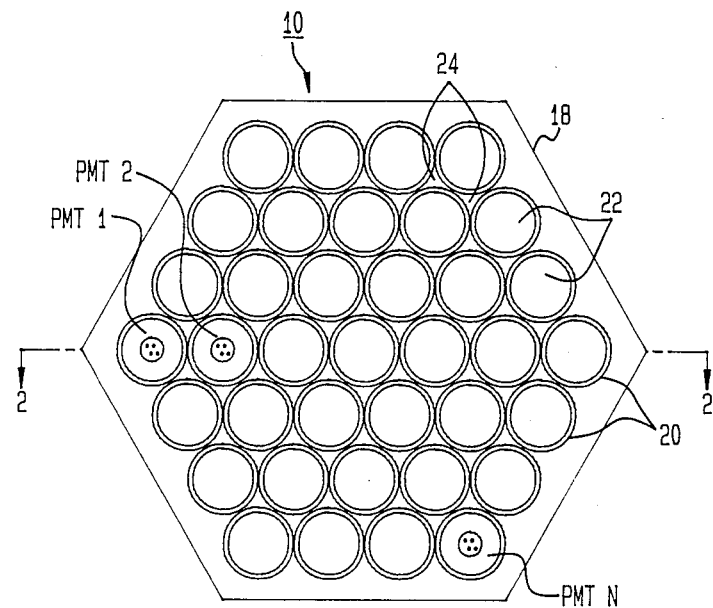
FIG. 1 shows a top view of a scintillation crystal assembly in a detector head, such as a scintillation gamma camera.
Figure 2:
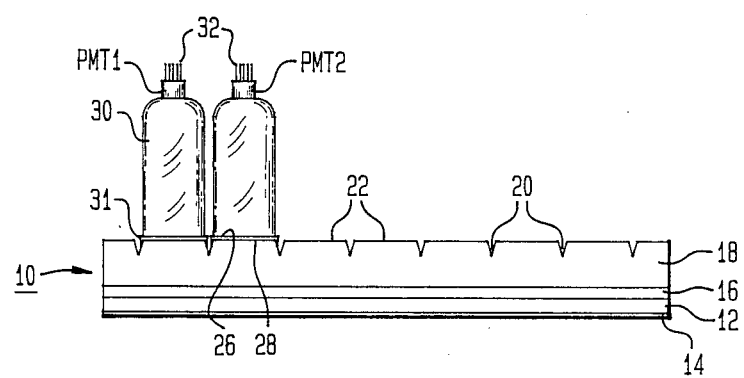
FIG. 2 shows the scintillation crystal assembly of FIG. 1 in a cross section.

In FIGS. 1 and 2 the scintillation crystal assembly 10, which has hexagonal shape, comprises a scintillation crystal 12 (e.g. NaI(T1)), an aluminum cover 14, a glass disc 16 and a light pipe 18 (e.g. acrylic plastic). The light pipe 18 is sculptured by means of circular grooves 20 into (e.g. 37) circular pads 22 and interstices 24. On each pad 22 a photomultiplier tube PMT1 to PMTN has to be placed. Thus a detector head (e.g. gamma camera head) will be created, which comprises for example a total of N=37 photomultiplier tubes. Merely three (of e.g. N=37) photomultiplier tubes are shown in FIGS. 1 and 2 for illustrating purpose.

Each photomultiplier tube PMT1 to PMTN has a bottom 26 and is bonded with its bottom 26 to a corresponding pad 22 by means of an elastic light transparent silicone rubber compound. The silicone rubber compound has a transparency of greater than 0.8 through 1 cm at 400 nm wavelengths and a moderate refractive index from about 1.4 to 1.6, at 400 nm. Such a silicone rubber adhesive is available for example from General Electric Company, Silicone Products Division, RTV Products Department, Waterford, N.Y. 12188 under the name RTV 615 or RTV 655 (see General Electric's brochure CDS-1870A "RTV silicone Rubber Product Data RTV 615, RTV 655 and RTV 670, High Strength Transparent Silicone Rubber Compounds"). Other usable silicone rubber adhesives are for example the Sylgard ® Silicone Elastomers 182 or 184 available from the Dow Corning Corporation, Midland, Mich., 48640 (see page 22 of Dow Corning's brochure "Materials for High Technology Applications"). In the present case RTV 615 of General Electric is used as adhesive. The silicone rubber bond is indicated with the numeral 28.

Also according to FIGS. 1 and 2 each photomultiplier tube PMT1 to PMTN is protected from external magnetic fields by a shield 30 of mumetal. The shield 30 has been slipped over the photomultiplier tube and has been embedded with its lower end in a ring 31 of silicone rubber which overtops the bottom 26 of the photomultiplier tube. The electrical wires 3 of each photomultiplier tube PMT1 to PMTN form a harness (now shown) for electrical connection.

FIG. 3 shows a first simple method and device for demounting a photomultiplier tube PMT$_i$ by means of a thread 40 (e.g. music wire of about 0.01 to 0.03 inch diameter). After having removed the shield 30 by pulling the shield in direction of the arrow 42 the thread is placed around the bond 28 at the upper surface of the silicone rubber ring 31 such that it forms a noose 44. The thread ends 46 are wrapped around the lower end 48 of a rod 50 as shown in FIG. 3. When twisting the rod 50 at its upper end 52 by means of the handle 54 in direction of the arrow 56 around its longitudinal axis 58 the thread continues to wind around the rod thereby making the loop smaller and shearing the bond. Thus a defective photomultiplier tube can easily be replaced.

FIG. 4 shows a second simple method and device for demounting a photomultiplier tube PMT$_i$ by means of a thread 40 (e.g. again music wire of about 0.01 to 0.03 inch diameter). The thread is again placed around the bond 28 at the upper surface of the silicone rubber ring 31 such that it forms a noose 44. However, in contrast to the embodiment of FIG. 3 the ends 46 of the thread have been threaded through a bore 70 of a tube 72. By pulling up on the thread ends 46 by means of a handle 74 fixed thereon the loop is again made smaller thereby shearing the bond.

As shown in FIG. 5, instead of a handle 74 also a pair of pliers 76 can be used for pulling the ends 46 of the thread.

The thread 40 can be any wire or flexible string of suitable diameter with a breaking strength greater than 267 lbs. for example.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto.

What is claimed is:

1. A device for demounting in a radiation detector a photomultiplier tube which is bonded with its scintillation crystal assembly by means of an elastic light transparent adhesive, comprising:

(a) a music wire of about 0.01 to 0.03 inch diameter which forms a noose between its wire ends, said noose being provided for being placed around the bond; and (b) twisting means connected with both wire ends for twisting them such that the noose becomes smaller thereby shearing the bond.

2. A device according to claim 1, wherein (a) the twisting means comprises a rod having a longitudinal axis; and (b) the wire ends are connected with the rod such that by twisting the rod around its longitudinal axis the wire winds around the rod, thereby making the noose smaller.

3. A device according to claim 2, wherein the wire ends are wrapped around the rod such that when twisting the rod the wire continues to wind around the rod thus making the noose smaller.

4. A device according to claim 3, wherein the wire ends are wrapped around the rod such that the noose is left at one end of the rod.

5. A device for demounting in a radiation detector a photomultiplier tube which is bonded with a scintillation crystal assembly by means of an elastic light transparent adhesive, comprising:

(a) a thread which forms a noose between its thread ends, said noose being provided for being placed around the bond between photomultiplier tube and scintillation crystal assembly; and (b) a rod having a lower and upper ends and a longitudinal axis;

wherein the thread ends are connected with the rod at its lower end such that by twisting the rod at its upper end around its longitudinal axis the thread winds around the lower end of the rod, thereby making the noose smaller such that the thread shears the bond.

6. A device according to claim 5, wherein the thread ends are wrapped around the lower end of the rod such that when twisting the rod the wire continues to wind around the lower end of the rod thus making the noose smaller.

7. A device according to claim 6, wherein the thread ends are wrapped around the lower end of the rod such that the noose is left at the lower end of the rod.

8. A device according to claim 5, wherein the thread is a wire.

9. A device according to claim 8, wherein the wire is a music wire of about 0.01 to 0.03 inch diameter.

* * * * *